United States Patent [19]
Mueller

[11] Patent Number: 5,890,746
[45] Date of Patent: Apr. 6, 1999

[54] COOLED AND WETTED REDUNDANT SEAL TUBE FITTING

[75] Inventor: Peter W. Mueller, Morrow, Ohio

[73] Assignee: General Electric Company, Cincinnati, Ohio

[21] Appl. No.: 768,910

[22] Filed: Dec. 18, 1996

[51] Int. Cl.[6] .................................................. F16L 55/00
[52] U.S. Cl. .......................... 285/92; 285/113; 285/334.4; 285/359
[58] Field of Search ................................ 285/92, 81, 113, 285/332, 332.1, 332.3, 332.4, 328, 334.4, 385, 353, 394, 358, 359, 395

[56] References Cited

U.S. PATENT DOCUMENTS

| | | | |
|---|---|---|---|
| 2,661,965 | 2/1953 | Parmesan | 285/113 |
| 4,185,462 | 1/1980 | Morse, II et al. | 60/261 |
| 4,295,666 | 10/1981 | Melanson | 285/14 |
| 4,475,748 | 10/1984 | Ekman | 285/3 |
| 5,094,480 | 3/1992 | Boileau | 285/334.4 X |
| 5,215,336 | 6/1993 | Worthing | 285/81 |
| 5,263,312 | 11/1993 | Walker et al. | 60/39.31 |
| 5,306,052 | 4/1994 | Me Gushion | 285/328 |
| 5,350,200 | 9/1994 | Peterson et al. | 285/92 |
| 5,362,110 | 11/1994 | Bynum | 285/92 X |

Primary Examiner—Heather Shackelford
Attorney, Agent, or Firm—Andrew C. Hess; Rodney M. Young

[57] ABSTRACT

A tube coupling assembly has independent primary and secondary sealing elements. The coupling assembly includes first and second coupling members which define a fluid passage therethrough. The coupling members are arranged relative to one another so as to define a contact seal therebetween. An annular fluid path extends between the contact seal and the fluid passage, and a seal element, such as an O-ring is disposed in said fluid path. Accordingly, the seal element is always in contact with, and thus cooled by, the fluid in the passage. The coupling assembly also includes a coupling nut disposed over a portion of one of the coupling members and threadingly engaging the other coupling member to retain the coupling members together. A plurality of resilient fingers is provided on one of the coupling members, and a plurality of grooves is formed in the coupling nut. The fingers are received in the grooves so as to oppose rotational displacement of the coupling nut from its assembled position.

10 Claims, 2 Drawing Sheets

5,890,746

COOLED AND WETTED REDUNDANT SEAL TUBE FITTING

BACKGROUND OF THE INVENTION

This invention relates generally to gas turbine engines and more particularly to tube coupling assemblies for use in connecting fluid tubing in gas turbine engines.

Gas turbine engines such as those used for aircraft propulsion generally include external tubing systems for delivering fluids, such as jet fuel, hydraulic fluid and lubricating oils, from one engine component to another or for connecting an engine component with an aircraft system. These tubing systems typically include tube coupling assemblies (often referred to as tube fittings) to connect adjacent fluid-carrying tubes or to connect a tube to another engine component. In an aircraft engine, a leak of a flammable fluid could result in a fire and/or loss of power which would jeopardize the safety of the aircraft flight. Thus, the primary requirement of any tube coupling assembly is that it not leak.

Various types of coupling assemblies or tube fittings have been employed in the aircraft engine industry to effect leak proof connections. One prior tube coupling assembly which has been commonly used in gas turbine engines is the ballnose fitting. A ballnose fitting typically comprises a tube connector connected to a first fluid-carrying tube, a ferrule connected to a second fluid-carrying tube and a coupling nut having internal threads which engage external threads on the tube connector so as to urge the tube connector and ferrule against one another in sealing engagement, thereby forming a single sealing element. Such single element fittings often employ shrouds with drain systems to contain any leakage which may occur.

Although single element fittings have been used advantageously in a number of gas turbine engine applications, they are subject to certain limitations. For instance, it is believed that shrouds and drain systems not only add to the complexity of the engine construction, thereby increasing expense and maintenance time, but also increase the weight of the engine.

Accordingly, there is a need for a tube coupling assembly which eliminates the need for shrouds and drain systems while providing excellent sealing integrity.

SUMMARY OF THE INVENTION

The above-mentioned needs are met by the present invention which provides a coupling assembly having independent primary and secondary sealing elements. The coupling assembly comprises first and second coupling members which have a fluid passage therethrough. The coupling members are arranged relative to one another so as to define a contact seal therebetween. An annular fluid path extends between the contact seal and the fluid passage, and a seal element, such as an O-ring, is disposed in the fluid path. Accordingly, the seal element is always in contact with, and thus cooled and lubricated by, the fluid in the passage. The coupling assembly also includes a coupling nut disposed over a portion of one of the coupling members and threadingly engaging the other coupling member to retain the coupling members together.

The present invention thus combines in series a wet O-ring primary seal followed by a secondary contact seal so that the working fluid must defeat each seal, independent of the other, before the seal integrity of the coupling assembly is breached. The invention retains the simplicity and effectiveness of two industry proven sealing concepts while yielding a reliability equal to the product of the reliability of the individual seals. No assembly or maintenance requirements beyond those of current coupling assemblies are required to achieve the high reliability, low cost and weight advantages of the present invention.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
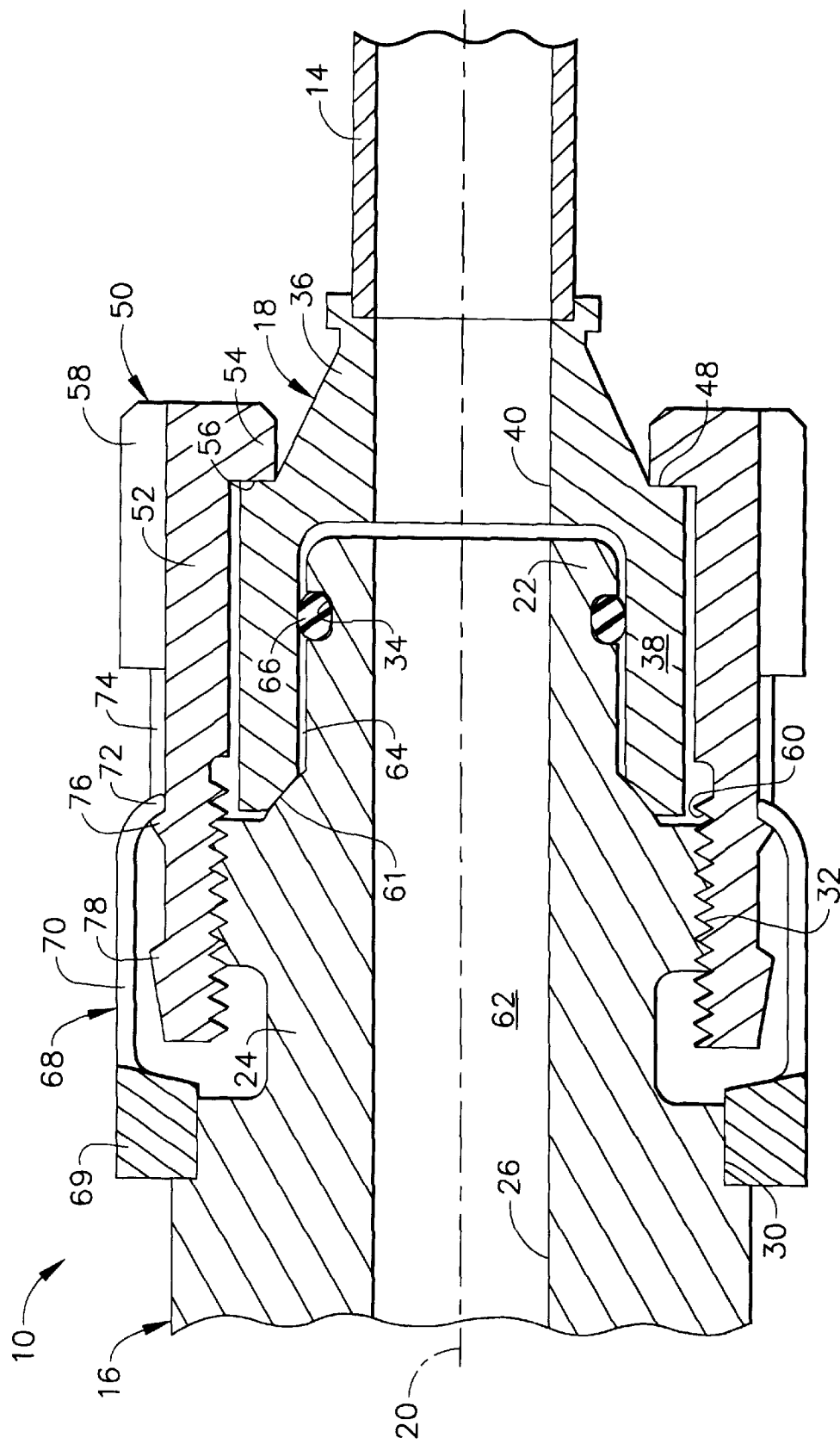
FIG. 1 is a longitudinal cross section of the tube coupling assembly of the present invention in a fully assembled state.
Figure 2:
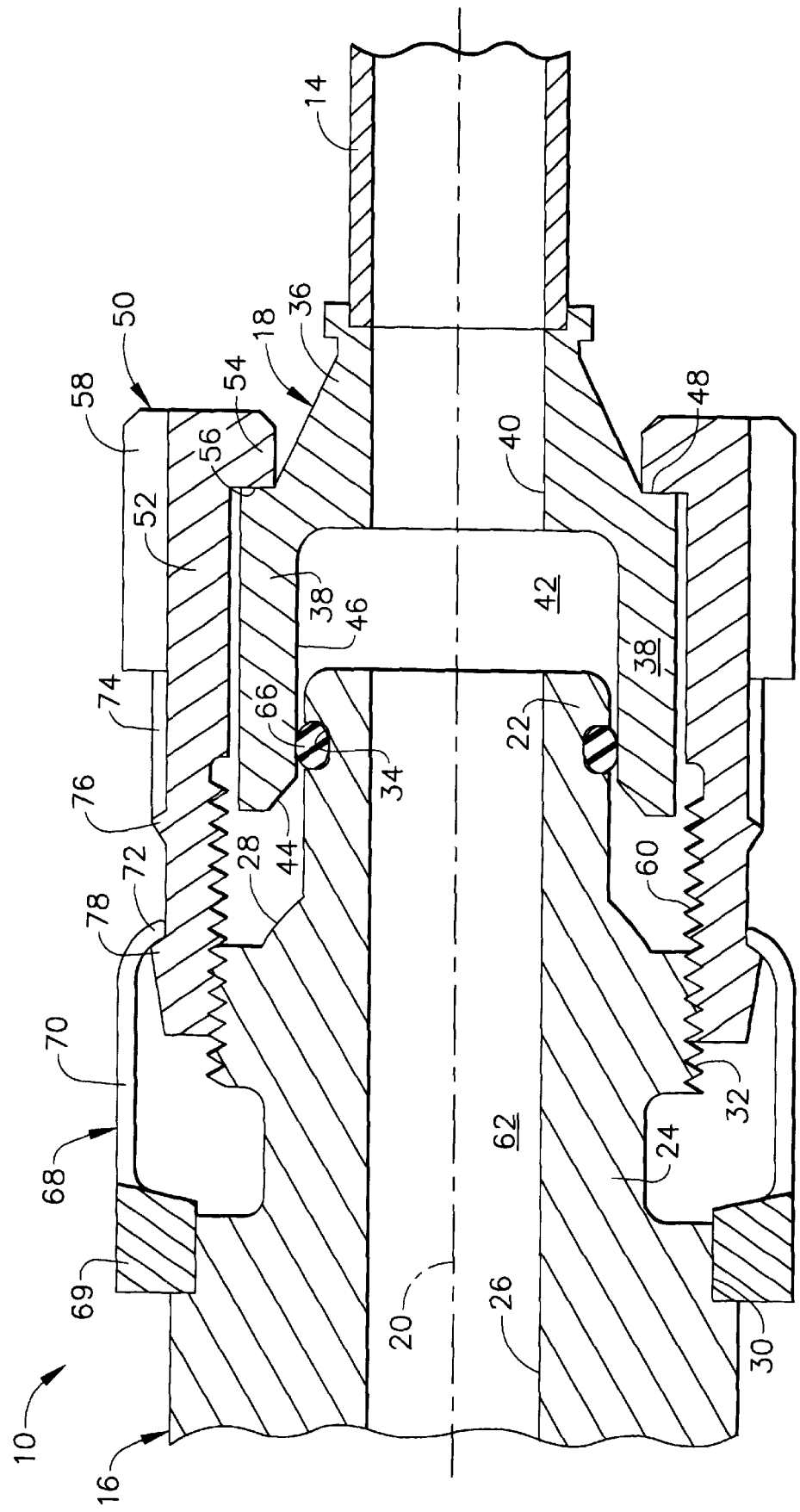
FIG. 2 is a longitudinal cross section of the tube coupling assembly of the present invention in a partially assembled state.

Referring to the drawings wherein identical reference numerals denote the same elements throughout the various views, FIGS. 1 and 2 illustrate the tube coupling assembly 10 of the present invention. Tube coupling assembly 10 is used to fluidly connect adjacent fluid-carrying tubes or a tube to another engine component. In a preferred embodiment, the tubes are part of an external tubing system of a gas turbine engine (not shown) and may be used to transport either liquids or gases. However, it should be understood that tube coupling assembly 10 may also be used to fluidly connect tubes or other components which are used in systems other than those utilized by gas turbine engines.

Tube coupling assembly 10 comprises a first coupling member 16 and a second coupling member 18 which are each disposed about a longitudinal axis 20 of tube coupling assembly 10. Coupling members 16, 18 may be formed of any material capable of accommodating the types of fluids, pressures, temperatures, etc. to which tube coupling assembly 10 will be exposed. Suitable materials include, but are not limited to, stainless steel, superalloys and titanium.

First coupling member 16 includes a first cylindrical portion 22 at the distal end thereof and a second generally cylindrical portion 24 having a larger outside diameter than first portion 22. A bore 26 extends through both portions of first coupling member 16 along longitudinal axis 20. A spherical or crowned first seal surface 28 (FIG. 2) is formed on the outer surface of first coupling member 16 between first portion 22 and second portion 24. Second portion 24 includes a stepped outer cylindrical surface 30 formed thereon and a set of external threads 32 disposed adjacent to first portion 22. An annular positioning groove 34 is formed in the outer surface of first portion 22.

Second coupling member 18 includes a conical main portion 36 and a cylindrical sleeve portion 38 connected to main portion 36. A bore 40 extends through main portion 36 along longitudinal axis 20, and a larger cylindrical bore 42 (FIG. 2) extends through sleeve portion 38 along longitudinal axis 20. Cylindrical bore 42 of sleeve portion 38 is large enough so that sleeve portion 38 can fit over first portion 22 of first coupling member 16. Sleeve portion 38 includes a generally frustoconical second seal surface 44 (FIG. 2) located at the distal end thereof, adjacent to the inner surface 46 of sleeve bore 42. Second seal surface 44 is configured for mating sealing engagement with first seal surface 28. A first axially facing annular abutment surface 48 is disposed on the outer surface of second coupling member 18 at the intersection of main portion 36 and sleeve portion 38.

In use, the narrow end of conical main portion 36 of second coupling member 18 is affixed to a fluid-carrying tube 14. The connection can be made in any conventional manner, such as welding, swaging or brazing. The outer end of first coupling member 16 is similarly affixed to a fluid-carrying tube or other engine component (not shown).

Tube coupling assembly 10 further comprises an annular coupling nut 50 which is disposed in surrounding relationship with a portion of second coupling member 18. Coupling nut 50 includes a cylindrical body 52 having a flange 54 extending radially inward at one end thereof. Flange 54 defines a second axially facing annular abutment surface 56. An external wrenching surface 58, which preferably has a hexagonal shape, is formed on the outer surface of cylindrical body 52, at the same end thereof as flange 54. Internal threads 60 are formed in coupling nut 50 at the end of cylindrical body 52 opposite flange 54.

Coupling nut 50 and first coupling member 16 threadingly engage one another via engagement of internal threads 60 with external threads 32. This causes second abutment surface 56 of coupling nut 50 to contact first abutment surface 48 of second coupling member 18, and sleeve portion 38 of second coupling member 18 to partially enclose first portion 22 of first coupling member 16 (FIG. 2). Further tightening of coupling nut 50 exerts an axial load on second coupling member 18 which forces second seal surface 44 against first seal surface 28 to form a surface-to-surface contact seal 61 between first and second coupling members 16, 18 which prevents fluid from escaping tube coupling assembly 10 (FIG. 1). By providing first seal surface 28 and second seal surface 44 with spherical and conical configurations, respectively, alignment of these two surfaces is facilitated and a fluid tight seal is ensured when coupling nut 50 is properly torqued. It should be noted that the surface configurations could be easily reversed. That is, first seal surface 28 could be conical and second seal surface 44 spherical.

When so assembled, sleeve portion 38 of second coupling member 18 fully encloses first portion 22 of first coupling member 16, and bore 26 and bore 40 are aligned so as to define a passage 62 for providing fluid flow through tube coupling assembly 10. It should be noted that tube coupling assembly 10 is not flow-direction sensitive; that is, assembly 10 can accommodate fluid flow in either direction through passage 62.

The inside diameter of the sleeve portion 38 is slightly larger than the outside diameter of first portion 22 so as to define an annular gap therebetween which provides a fluid path 64 between passage 62 and contact seal 61. An annular seal element 66, preferably an elastic element such as an O-ring or the like, is disposed in positioning groove 34 and thereby forms a seal in fluid path 64. This location of seal element 66 ensures that it is always in contact with, and thus cooled and lubricated by, the fluid in passage 62, thereby improving its reliability.

Thus, tube coupling assembly 10 provides a redundant fluid connection having primary (O-ring seal 66) and secondary (contact seal 61) seals which function independently. That is, the proper function of one seal does not depend on the other. When both seals are properly functioning, a connection of very high sealing integrity is obtained because working fluid must defeat each seal independently of the other before assembly 10 is breached.

Tube coupling assembly 10 further comprises a locking mechanism 68 for preventing first coupling member 16 and second coupling member 18 from separating. Locking mechanism 68 comprises an annular ring 69 affixed to outer cylindrical surface 30 of first coupling member 16 and a plurality of circumferentially spaced resilient fingers 70 which are attached to and extend axially from annular ring 69. Each of the fingers 70 includes a radially inwardly extending tip portion 72. A plurality of circumferentially spaced and axially extending grooves 74 is formed in the outer surface of coupling nut 50. Each groove 74 extends axially from the base of wrenching surface 58 to a point approximately midway between the base of wrenching surface 58 and the other end of coupling nut 50. A first annular detent 76 is formed on the outer surface of coupling nut 50 at the ends of the grooves opposite wrenching surface 58, and a second annular detent 78 is formed on the outer surface of coupling nut 50 at the threaded end thereof. First annular detent 76 and second annular detent 78 both have a steep side facing wrenching surface 58 and a shallow ramp side facing away from wrenching surface 58.

Due to their resilient nature, fingers 70 can slide over the ramp sides of first and second annular detents 76, 78 during the process of threadingly engaging coupling nut 50 on first coupling member 16. However, the other sides of first and second annular detents 76, 78 are sufficiently steep so as to oppose passage of fingers 70. Tip portions 72 and first annular detent 76 are positioned so that tip portions 72 will be received in grooves 74, in engagement with the steep side of first annular detent 76, when first and second seal surfaces 28, 44 come into contact to form contact seal 61 as shown in FIG. 1. The resulting engagement between fingers 70 and grooves 74 will oppose rotational displacement of coupling nut 50 from its assembly position which could occur as a result of a variety of forces, such as vibrations, which tube coupling assembly 10 could be subject to during operation.

The axial distance between first seal surface 28 and seal member 66 is greater than the axial distance between first annular detent 76 and second annular detent 78. Thus, when coupling nut 50 is disposed on first coupling member 16 so that tip portions 72 engage the steep side of second annular detent 78 (as shown in FIG. 2), sleeve portion 38 of second coupling member 18 will be disposed over seal member 66, thereby providing a seal between first and second coupling members 16, 18 even when coupling nut 50 is not completely torqued.

While specific embodiments of the present invention have been described, it will be apparent to those skilled in the art that various modifications thereto can be made without departing from the spirit and scope of the invention as defined in the appended claims.

What is claimed is:

1. A coupling assembly comprising:
    a first coupling member;
    a second coupling member being disposed relative to said first coupling member so as to form a passage through said first and second coupling members and to define a contact seal between said first and second coupling members;
    a fluid path extending between said contact seal and said passage;

a seal element disposed in said fluid path;

a coupling nut disposed over a portion of said second coupling member, said coupling nut threadingly engaging said first coupling member to retain said first and second coupling members together;

a plurality of resilient fingers formed on one of said first and second coupling members and a plurality of grooves formed in said coupling nut for receiving said fingers to oppose rotational displacement of said coupling nut; and a first annular detent formed on said coupling nut adjacent to said grooves and a second annular detent formed on said coupling nut adjacent to one end of said coupling nut, wherein the axial distance between said contact seal and said seal element is greater than the axial distance between said first annular detent and said second annular detent.

2. A coupling assembly comprising:

a first coupling member having a first seal surface and a cylindrical portion, said cylindrical portion having an annular groove formed in the outer surface thereof;

a second coupling member having a second seal surface and a cylindrical sleeve portion, said second coupling member being disposed relative to said first coupling member so that a flow passage is formed through said first and second coupling members, said cylindrical sleeve portion is disposed around said cylindrical portion of said first coupling member, and said first seal surface engages said second seal surface to define a contact seal between said first and second coupling members;

wherein said cylindrical sleeve portion is slightly larger than said cylindrical portion of said first coupling member so as to define an annular gap therebetween, said gap defining a fluid path extending between said contact seal and said flow passage; and a seal element disposed in said annular groove in said fluid path.

3. The coupling assembly of claim 2 further comprising a coupling nut disposed over said second coupling member, said coupling nut threadingly engaging said first coupling member to retain said first and second coupling members together.

4. The coupling assembly of claim 2 wherein at least one of said first and second seal surfaces is spherical.

5. The coupling assembly of claim 2 wherein at least one of said first and second seal surfaces is frusto-conical.

6. The coupling assembly of claim 2 wherein said seal element is an elastic element.

7. The coupling assembly of claim 2 wherein said seal element is an O-ring.

8. The coupling assembly of claim 2 wherein said seal element is cooled and lubricated by fluid in said fluid path.

9. The coupling assembly of claim 3 further comprising a plurality of resilient fingers formed on one of said first and second coupling members and a plurality of grooves formed in said coupling nut for receiving said fingers to oppose rotational displacement of said coupling nut.

10. The coupling assembly of claim 9 further comprising a first annular detent formed on said coupling nut adjacent to said grooves and a second annular detent formed on said coupling nut adjacent to one end of said coupling nut, wherein the axial distance between said contact seal and said seal element is greater than the axial distance between said first annular detent and said second annular detent.

* * * * *